United States Patent Office 2,764,526
Patented Sept. 25, 1956

2,764,526

METHOD OF HYDRODESULFURIZING HYDROCARBON OIL USING A COBALT TITANATE CATALYST

Carl E. Johnson, Griffith, and Wilford J. Zimmerschied, Crown Point, Ind., assignors to Standard Oil Company, Chicago, Ill., a corporation of Indiana No Drawing. Application August 17, 1954,
Serial No. 450,542

7 Claims. (Cl. 196—24)

This invention relates to the desulfurization of hydrocarbon oils and has special application to catalysts for the removal of sulfur. More particularly it relates to a method for the selective desulfurization of olefinic hydrocarbon oils.

Petroleum or other hydrocarbon oils which contain appreciable amounts of sulfur compounds are objectionable for use as fuel, lubricating oils, solvents, or cracking stocks and the like. The high sulfur components, e. g. coke still naphtha, of gasoline require desulfurization in order to produce a blended gasoline meeting the requirement of low sulfur content. A number of catalysts are available for the hydrodesulfurization of virgin naphthas, but if they are employed in hydrodesulfurizing olefinic naphthas such as thermally or catalytically cracked naphthas, they catalyze indiscriminate desulfurization and hydrogenation of the higher octane olefins to produce lower octane paraffins. The olefinic naphthas, e. g. coke still naphtha, may suffer a loss of 10 to 20 octane numbers. In addition, a considerable amount of expensive hydrogen is used in saturating the olefins.

An object of this invention is to provide a method and means for desulfurizing hydrocarbon oils. A further object is to provide a highly selective desulfurization catalyst eminently useful for desulfurizing olefinic hydrocarbon oils with a minimum consumption of hydrogen. An important object of this invention is to provide an economical method and means for achieving a high degree of desulfurization of olefinic naphthas while maintaining saturation, i. e. hydrogenation, of the olefinic components at a minimum and thereby obtaining a desulfurized olefinic naphtha whose octane number has not been substantially reduced during hydrodesulfurization. Other objects will become apparent from the detailed description of our invention.

It has been discovered that cobalt titanate, which is a chemical compound of the inverse spinel type having the formula Co(TiCo)O$_4$ and is not a mere mechanical mixture, is a highly effective catalyst for the hydrodesulfurization of hydrocarbon oils. It may be employed alone or as the essentiall component of a contact or catalyst mass. The cobalt titanate may be prepared by calcining an intimate mixture of a cobalt compound affording a cobalt oxide, e. g. a carbonate, hydroxide, or oxide of cobalt, preferably cobaltous carbonate, with a titanium compound affording an oxide of titanium, e. g. hydroxides, acids, and oxides of titanium, preferably titanium dioxide itself. It is necessary that the mixture undergoing calcination contains a molar ratio of cobalt to titanium of approximately 2:1 in order that cobalt titanate having the inverse spinel type structure be formed. The calcination of the mixture is conducted at a temperature of about 1400 to 2000° F. for the necessary time to produce cobalt titanate, usually about 1 to 24 hours. The cobalt titanate thus produced may be employed as such or pulverized and pelleted alone or in admixture with a distender such as activated alumina. The hydrocarbon oil such as coke still naphtha is contacted with the catalyst at a temperature of about 600 to 1000° F., e. g. 750° F., in the presence of hydrogen preferably under a partial pressure of hydrogen of about 500 p. s. i. g., although lower and higher total pressures and partial pressures of hydrogen may be employed. Space velocities in the range of about 0.5 to 20, preferably about 2.0, volumes of oil per hour per volume of catalyst may be employed. A high degree of selective hydrodesulfurization of olefinic naphthas with a much lesser degree of saturation of the olefinic constituents may be attained when using the cobalt titanate catalyst. Hydrogenation of olefinic constituents of a petroleum fraction such as coke still naphtha proceeds to a much lesser extent than is obtained when using conventional hydrodesulfurization catalysts such as the cobalt oxide-molybdenum oxide on alumina catalyst of U. S. 2,325,033. The reduction in octane number is less for the olefinic naphtha hydrodesulfurized in accord with this invention, and the octane rating with 3 cc. of lead tetraethyl is higher than the original feed whereas the same olefinic naphtha desulfurized to the same extent by the cobalt oxide-molybdenum oxide on alumina catalyst yields a naphtha of lower octane number than the feed even when it contains 3 cc. of added lead tetraethyl.

Cobalt titanate is a true chemical compound having an inverse spinel type structure. The crystallographic cell structure contains 32 oxygen atoms arranged in cubic close packing. There are positions in the cell for 8 metal atoms surrounded tetrahedrally by 4 oxygen atoms and 16 other positions for the metal atoms that are surrounded octahedrally by 6 oxygen atoms. This inversed spinel type structure has one-half the cobalt atoms in the tetrahedral position, and the remaining one-half of the cobalt atoms and all the titanium atoms are arranged at random among the 16 octahedral positions. The cubic structure measures 8.43 A° along the side. Cobalt titanate may be made in accordance with German Patent 684,658 assigned to Titan Co., Inc. which discloses its use as a pigment. It may be prepared by commingling a cobalt compound which will afford an oxide of cobalt with a titanium compound which will afford an oxide of titanium, and heating the intimate mixture for a period of about 1 to 24 hours at a temperature of about 1400–2000° F. The cobalt compounds which may be used are: $CoCO_3$, $2CoCO_3 \cdot 3CO(OH)_2 \cdot H_2O$, $Co(OH)_2$, $Co_2O_3 \cdot 3H_2O$, $CoO$, $Co_3O_4$, $Co_2O_3$, and the like. Titanium compounds which may be used are: $Ti(OH)_3$, $Ti(OH)_4$, $H_2TiO_3$, $H_4TiO_4$, $TiO$, $Ti_2O_3$, $TiO_2$, and $TiO_3$. It is preferred to employ cobaltous carbonate ($CoCO_3$) and titanium dioxide ($TiO_2$). It is necessary that the mixture of the cobalt compound and titanium compound contains a molar ratio of cobalt to titanium of approximately 2:1. If less cobalt is employed, for example a molar ratio of cobalt to titanium of 1:1, the resultant compound obtained after calcination is cobalt titanite ($CoTiO_3$) which is a non-spinel type compound of hexagonal structure, and is inferior to the Co(TiCo)O$_4$ as a catalyst for selective hydrodesulfurization. Likewise, if the molar ratio of cobalt to titanium is more than approximately 2:1, for example 2.37:1, the cobalt-titanium compound obtained upon calcination is decidely inferior to the cobalt titanate prepared by calcining the proper ratio containing approximately 2 mols of cobalt per mol of titanium. While a temperature of from about 1400 to 2000° F. may be employed in calcining the mixture, a temperature of about 1800° F. is preferred. The calcination is conducted for the proper length of time necessary to form cobalt titanate. This may be between 1 to 24 hours or more, suitably 3 to 18 hours. The cobalt titanate will vary in color from a green to a blue as the temperature of calcination is increased and the time of calcination is increased. Cobalt titanate is stable at very high temperatures, e. g. 1400 to 2000° F., and has this inherent advantage over other desulfurization catalysts wherein the temperature of regeneration of the catalyst must be carefully controlled to about below 1200° F. in order to avoid sintering and deactivation of the catalyst. The cobalt titanate may be employed in the desulfurization process in the form of fragments as obtained from the calcination method of manufacture, or the fragments may be pulverized and pelleted with the aid of 1–2% of Sterotex (hydrogenated corn oil), stearic acid, or the like as a binder which is subsequently burned from the pellets. The cobalt titanate may be employed on carriers, spacing agents, or other contact masses of a relatively inert nature, e. g. bauxite, activated alumina, and the like. For example, a minor proportion of pulverized cobalt titanate and a major proportion of pulverized activated alumina or hydrous alumina gel may be thoroughly commingled, dried, pelleted, and calcined to produce a distended cobalt titanate catalyst.

Hydrocarbon oils which may be desulfurized are those such as petroleum and fractions thereof, coal hydrogenation oils, shale oil, and the like which contain objectionable amounts of sulfur compounds, nitrogen compounds and oxygen compounds. The oil may be a virgin or cracked distillate. Catalytically or thermally cracked oils boiling in the naphtha boiling range, i. e. 80 to 400° F., are particularly suitable feeds to the process of this invention, although higher boiling oils up through the gas oil range may be employed. Olefinic naphthas such as contain an olefin to paraffin ratio in the range of 3:1 to 1:3 are particularly suitable feed stocks because minimum saturation of the olefin content occurs during the hydrodesulfurization process. An outstanding example of a high sulfur olefinic naphtha is a naphtha produced by the coking of a high sulfur reduced crude by conventional methods such as delayed coking or fluidized coking methods. Such a naphtha is exceedingly more difficult to desulfurize by conventional methods than are the olefinic napthas produced by thermal cracking or by catalytic cracking.

The hydrocarbon oil is desulfurized by passing it together with hydrogen through the reactor containing the catalyst. The catalyst may be contained in the reactor in tubes, trays, or other appropriate containers, or it may be employed in the fluidized state. The conditions employed in desulfurization using the cobalt titanate catalyst will of course vary to some extent dependent upon the type of hydrocarbon oil to be desulfurized and the extent of desulfurization desired. A temperature of 600 to 1000° F. may be used, the higher temperatures being employed in desulfurizing higher boiling feed stocks. When desulfurizing naphtha fractions a temperature of about 600 to 800° F., preferably about 750° F., may be employed. Under such conditions the naphtha is desulfurized while in the vapor state, whereas when desulfurizing a gas oil a liquid phase condition is present. A pressure ranging from atmospheric to 3000 p. s. i. g. or higher may be employed in the reactor. The oil is contacted with the catalyst in the presence of hydrogen which may be present in partial pressure ranging as high as 3000 p. s. i. g., preferably about 500 p. s. i. g. The hydrogen may consist of introduced outside hydrogen as is employed in a conventional hydrofining type operation, or it may be generated within the reactor by dehydrogenation of the naphthenes present in the feed stock as occurs in "autofining." In "autofining," the hydrogen-containing dry gas fraction recovered from the desulfurized oil may be recycled to the reaction zone and the pressure therein allowed to rise to an equilibrium pressure, usually about 250 p. s. i. g., at which the hydrogen evolved equals the hydrogen consumed. This method of operation is described in U. S. Patent 2,648,623. Hydrogen or a hydrogen-rich gas may be employed at a rate of 100 to 10,000, preferably 100 to 6000 standard cubic feet of hydrogen per barrel of feed. Space velocities of between 0.5 to as high as 20 volumes of oil per hour per volume of catalyst, preferably between 1 to 3 volumes of oil per hour per volume of catalyst, may be employed. After the catalyst has been used for a sufficient length of time so that its activity begins to decline, it may be regenerated by burning the hydrocarbonaceous material therefrom employing diluted oxygen such as a mixture of flue gas with air. Because of the thermal stability of cobalt titanate, the temperature of regeneration need not be kept below 1200° F. as is necessary to avoid deactiviation of presently available commercial hydrodesulfurization catalysts. The temperature may be as high as about 1600–1800° F. Regeneration at higher temperatures is more rapid and the down-time of the hydrodesulfurization unit can be decreased. Not only will the use of cobalt titanate catalyst minimize costly equipment necessary to control regeneration of the catalyst, but it will have the added economic incentive of reducing unit down-time.

A preferred embodiment of this invention consists of contacting a coke still naphtha having a sulfur content of about 0.55%, bromine number of about 70, and an octane number of about 62, with the cobalt titanate catalyst at a temperature of about 750° F. A partial pressure of hydrogen of about 500 p. s. i. g. is maintained in the reactor. Hydrogen is employed at the rate of about 2000 standard cubic feet per barrel of naphtha. A space velocity of about 2 to 3 volumes of naphtha per hour per volume of catalyst is used, slightly higher desulfurization and olefin saturation being obtained at a space velocity of 2 than at 3 volumes of naphtha per hour per volume of catalyst. The cobalt titanate catalyst is one prepared by calcining an intimate mixture of cobaltous carbonate and titanium dioxide in a molar ratio of 2:1 at a temperature of 1800° F. for about 18 hours, pulverizing the cobalt titanate produced, then pelleting the pulverized cobalt titanate with about 2% of Sterotex (hydrogenated corn oil) and burning the Sterotex from the pellets at a temperature of 800° F. with air. The naphtha which has been hydrodesulfurized under the listed conditions using the described catalyst has about 85 to 90% of the sulfur removed in the form of separable hydrogen sulfide and suffers paraffination of the olefinic constituents to the extent of only about 45 to 50%. The selectivity of the catalyst for desulfurization in preference to paraffination of the olefins is about 1.8 (as determined by dividing the percentage of desulfurization by the percentage of paraffination). Under the described conditions of operation, the octane rating of the hydrodesulfurized coke still naphtha with 3 cc. of added lead tetraethyl is higher than the octane number of the feed having 3 cc. of added lead tetraethyl.

The effectiveness of the cobalt titanate catalyst was demonstrated in a number of experiments. The catalyst was prepared by intimately mixing 230 grams of finely divided cobaltous carbonate with 75 grams of finely divided titanium dioxide (2.05 moles Co per mole of Ti), placing the mixture in an electric furnace and maintaining the temperature therein at 1800° F. for 18 hours. The product was identified by X-ray diffraction analysis as consisting of the inverse spinel type cobalt titanate having a trace of cobaltic oxide. The fragments were pulverized by ball-milling and were then pelleted to form ⅛-inch pills using about 2% Sterotex (hydrogenated corn oil) as a binder. The Sterotex was burned from the pills at about 800° F. with air. 60 cc. (123.8 grams) of the cobalt titanate pills were placed in the center section of an electrically heated one-inch (i. d.) stainless steel vertical reactor approximately 38 inches long. The section above the catalyst was packed with glass beads to act as a preheat section for the incoming feed. Coke still naphtha (which was obtained from the delayed coking of a mixture of high sulfur reduced crude primarily of West Texas origin) having a sulfur content of 0.545% and a bromine number of 70 was passed together with once-through hydrogen (at a rate approximating 2000 standard cubic feet of hydrogen per barrel of naphtha) through the top of the downflow reactor. The total effluent was collected in a pressurized receiver and the naphtha condensed therein. The temperature, pressure, and space velocity were varied in individual runs to determine their effect upon desulfurization and olefin paraffination. The same catalyst was employed in each run and all together a total of 2915 cc. of coke still naphtha was introduced as feed. In each run, the desulfurized product naptha was collected in a number of individual fractions. The percentage of sulfur and the bromine number of each fraction were measured. The percentage reduction of sulfur content was calculated and the percentage reduction in the bromine number was calculated, the latter being expressed as percent paraffination. The selectivity of the catalyst is measured by its preference for desulfurizing the naphtha rather than hydrogenating the olefins to produce paraffins. Selectivity was measured as the percentage desulfurization of the coke still gas oil divided by the percentage of paraffination of the coke still gas oil. The data obtained in these runs are set forth in Table I which follows:

TABLE I

| Run No. | Temp., °F. | Pressure, p.s.i.g. | Space Velocity, Vol. oil/Hr./Vol. cat. | Percent Desulfurization | Percent Paraffination | Selectivity [1] |
|---|---|---|---|---|---|---|
| 1 | 750 | 1,000 | 2.0 | 81 | 52.3 | 1.5 |
|   |     |       |     | 81 | 50.0 | 1.6 |
|   |     |       |     | 82 | 54.2 | 1.5 |
|   |     |       |     | 83 | 56.4 | 1.5 |
| 2 | 750 | 500 | 2.0 | 88 | 48.6 | 1.8 |
|   |     |     |     | 86 | 47.9 | 1.8 |
|   |     |     |     | 87 | 49.3 | 1.8 |
|   |     |     |     | 87 | 54.2 | 1.6 |
|   |     |     |     | 84 | 42.0 | 2.0 |
| 3 | 750 | 500 | 3.0 | 80 | 42.2 | 1.9 |
|   |     |     |     | 82 | 44.3 | 1.8 |
|   |     |     |     | 80 | 47.1 | 1.7 |
| 4 | 750 | 500 | 1.0 | 92 | 70.6 | 1.3 |
|   |     |     |     | 93 | 72.2 | 1.3 |
|   |     |     |     | 92 | 71.4 | 1.3 |
| 5 | 700 | 500 | 2.0 | 79 | 49.3 | 1.6 |
|   |     |     |     | 72 | 41.4 | 1.7 |
| 6 | 650 | 500 | 2.0 | 56 | 28.6 | 2.0 |
|   |     |     |     | 56 | 27.9 | 2.0 |

[1] Selectivity = $\frac{\text{percent desulfurization}}{\text{percent paraffination}}$ The data show that cobalt titanate has a high selectivity for desulfurizing the olefinic coke still naphtha rather than hydrogenating the olefins to paraffins. It will be noted from the data that the conditions employed in Runs 2 and 3 were most conducive to high desulfurization with high selectivity. In addition to minimizing or eliminating the loss of octane numbers suffered by the olefinic naphtha, the use of cobalt titanate reduces the consumption of hydrogen thus rendering the process more economic. Although the cobalt titanate catalyst was contacted with approximately 49 volumes of coke still naphtha per volume of catalyst, it did not show evidence of loss of activity.

To compare the effectiveness of the cobalt titanate catalyst with a commercial hydrodesulfurization catalyst, separate samples of the same coke still naphtha were hydrodesulfurized under conditions selected to achieve the same extent of desulfurization with the commercial catalyst as was obtained in previous Run No. 3 with the cobalt titanate catalyst, i. e., 80% desulfurization. The commercial catalyst employed was a cobalt oxide-molybdenum oxide on alumina catalyst manufactured by Harshaw Chemical Company and containing 3% CoO and 9% $MoO_3$. The octane numbers of the feed, the product naphtha from hydrodesulfurization using cobalt titanate catalyst (the product of Run 3 in Table I), and the hydrodesulfurized naphtha obtained using the commercial catalyst, were determined on an unleaded basis and also with 1 cc. and 3 cc. of lead tetraethyl. The results are shown in Table II which follows:

TABLE II

*Octane ratings of hydrodesulfurized coke still naphtha*

| Run No. | Catalyst | Percent Desulfurization | Octane Ratings, CFR-R | | |
|---|---|---|---|---|---|
|   |   |   | Clear | 1 cc. TEL | 3 cc. TEL |
| Feed |  |  | 61.7 | 67.2 | 72.2 |
| 3 | Cobalt Titanate | 80 | 56.4 | 66.2 | 75.6 |
| 7 | Commercial catalyst [1] | 79 | 52.8 | 61.8 | 70.7 |

[1] Cobalt oxide-molybdenum oxide on alumina.

It is apparent from the above data that the use of cobalt titanate can eliminate the octane number loss suffered by the olefinic naphtha during its hydrodesulfurization. It enables a petroleum refiner to obtain a higher octane number desulfurized olefinic naptha than he has been able to obtain heretofore by hydrofining (hydrodesulfurizing) such naphthas with available catalysts. The refiner is provided by this invention with an economical method of producing a low sulfur olefinic naptha of improved octane number for blending to form the finished gasoline.

In the manufacture of the catalyst, variations in the molar ratio of cobalt to titanium in the intimate mixture subjected to calcination will affect the activity of the catalyst for desulfurization and olefin paraffination. This molar ratio must be approximately 2:1 in order to obtain the selective cobalt titanate catalyst having the inverse spinel type structure which displays a high catalytic activity for desulfurization and a very mild activity for olefin paraffination. A number of cobalt and titanium-containing compositions were prepared which demonstrate the necessity of employing a molar ratio of cobalt to titanium of approximately 2:1. The first composition was prepared by calcining an intimate mixture of cobaltous carbonate and titanium dioxide, in a molar ratio of 2.05:1 at a temperature of about 1800° F. for about 18 hours, pulverizing the $Co(TiCo)O_4$ (cobalt titanate) formed, pelleting to ⅛ inch pills with the aid of 2% Sterotex binder, and burning the Sterotex from the pills at 800° F. with air. This catalyst was tested with the results shown in Run No. 8 of Table III. A composition was prepared by calcining at 1800° F. for about 18 hours an intimate mixture of cobalto-cobaltic oxide with titanium dioxide in amounts such that the molar ratio of cobalt to titanium in the mixture was 2.37:1. The product of calcination was pulverized and then pelleted with about 2% Sterotex as a binder, the Sterotex being removed by burning with air at 800° F. This second composition was tested with the results shown in Run 9 of Table III. A third composition was prepared by calcining at 1425° F. for 18 hours an intimate mixture of cobaltous carbonate with titanium dioxide in a molar ratio of 1:1, pulverizing the calcined product, pelleting with about 2% Sterotex to form ⅛ inch pills, and burning out the Sterotex at about 800° F. with air. A composition consisting of cobalt titanite ($CoTiO_3$) having a hexagonal crystal structure as determined by X-ray diffraction analysis was obtained. The effectiveness of the cobalt titanate produced is shown in Run No. 10 of Table III. Each of the above compositions were employed as catalysts for the hydrodesulfurization of a coke still naphtha under comparable conditions, i. e. a temperature of about 750° F., a pressure of 1000 p. s. i., a space velocity of about 2 volumes of naphtha per hour per volume of catalyst, and in the presence of once-through hydrogen at a rate approximating 2000 standard cubic feet per barrel of naphtha. The effectiveness of the compositions prepared by calcining the mixtures containing varying molar ratios of cobalt to titanium for desulfurization, paraffination, and selectivity is shown in Table III which follows:

TABLE III

| Run No. | Molar Ratio, Co:Ti | Percent Desulfurization | Percent Paraffination | Selectivity [1] |
|---|---|---|---|---|
| 8 | 2.05:1 | 83 | 36.8 | 2.3 |
| 9 | 2.37:1 | 66 | 30.4 | 2.2 |
| 10 | 1:1 | 64 | 45.7 | 1.4 |

[1] Selectivity = $\frac{\text{percent desulfurization}}{\text{percent paraffination}}$ It is apparent that cobalt titanate (see Run No. 8) having the inverse spinel type structure is the most effective catalyst with respect to desulfurization and selectivity. From other runs it was noted that the activity of the cobalt titanate ($CoTiO_4$ of Run 10) was dropping at a rapid rate and that both its desulfurization ability and its selectivity were decreasing.

While catalyst compositions containing an effective amount of cobalt titanate are particularly effective for desulfurizing hydrocarbon oils, especially olefinic hydrocarbon oils, the catalyst may also be useful as a mild catalyst for the hydrogenation or hydrocracking of hydrocarbon oils. At higher temperatures such as about 950° F. and lower pressures of about 250–500 p. s. i., the catalyst may be employed for hydroforming naphtha fractions. The catalyst may be employed under the conditions previously recited for the principal purpose of removing nitrogen and oxygen compounds as well as sulfur compounds.

Thus having described the invention what is claimed is:

1. The method of desulfurizing a petroleum fraction containing sulfur compounds which comprises contacting said fraction at a temperature of about 600 to 1000° F. and at a pressure of about 100 to 3000 p. s. i. g. in the presence of hydrogen with a catalyst having an effective amount of cobalt titanate as the essential component, said cobalt titanate being prepared by calcining at a temperature of about 1400 to 2000° F. an intimate mixture of a cobalt compound affording an oxide of cobalt with a titanium compound affording an oxide of titanium in amounts such that the molar ratio of cobalt to titanium in the mixture is approximately 2:1.

2. The method of claim 1 wherein said cobalt compound is cobaltous carbonate.

3. The method of claim 1 wherein said catalyst consists essentially of a minor proportion of cobalt titanate and a major proportion of alumina.

4. The method of desulfurizing an olefinic naphtha containing sulfur compounds which method comprises contacting vapors of said naphtha and hydrogen at a temperature of about 600 to 800° F. and a pressure of about 100 to 3000 p. s. i. g. with a catalyst comprised essentially of cobalt titanate prepared by calcining at a temperature of about 1400 to 2000° F. an intimate mixture of a cobalt oxide with titanium dioxide in amounts such that the molar ratio of cobalt to titanium in the mixture is approximately 2:1, pulverizing the cobalt titanate produced, and forming catalyst pellets therefrom.

5. The method of desulfurizing an olefinic naphtha containing sulfur compounds which method comprises contacting vapors of said naphtha and hydrogen at a temperature of about 600 to 800° F. and a pressure of about 100 to 3000 p. s. i. g. with a catalyst comprised essentially of cobalt titanate prepared by calcining at a temperature of about 1400 to 2000° F. an intimate mixture of cobaltous carbonate and titanium dioxide in a molar ratio of approximately 2:1, pulverizing the cobalt titanate produced, and forming catalyst pellets therefrom.

6. The method of claim 5 wherein said naphtha is a coke still naphtha.

7. The method of desulfurizing a coke still naphtha which method comprises contacting a catalyst comprised essentially of cobalt titanate, said cobalt titanate being prepared by calcining an intimate mixture of cobaltous carbonate and titanium dioxide in a molar ratio of approximately 2:1 at a temperature of about 1800° F. for about 1 to 24 hours, with vapors of said naphtha at a temperature of 750° F. and a pressure of 500 p. s. i. g. in the presence of about 2000 standard cubic feet of hydrogen per barrel of naphtha and at a space velocity of about 2 volumes of naphtha per hour per volume of catalyst.

References Cited in the file of this patent

UNITED STATES PATENTS

| 2,325,034 | Byrns | July 27, 1943 |
| 2,393,288 | Byrns | Jan. 22, 1946 |
| 2,487,466 | Nahin | Nov. 8, 1949 |
| 2,500,146 | Fleck et al. | Mar. 14, 1950 |